(12) United States Patent  (10) Patent No.: US 7,931,407 B2
Begin et al.  (45) Date of Patent: Apr. 26, 2011

(54) SYSTEMS FOR SUPPLYING OIL FROM AN OIL SOURCE TO A BEARING ASSEMBLY

(75) Inventors: Louis P. Begin, Chandler, AZ (US); Bradley R. Tucker, Chandler, AZ (US); John P. Hogan, Gilbert, AZ (US)

(73) Assignee: Honeywell International Inc., Morristown, NJ (US)

( * ) Notice: Subject to any disclaimer, the term of this patent is extended or adjusted under 35 U.S.C. 154(b) by 908 days.

(21) Appl. No.: 11/847,516

(22) Filed: Aug. 30, 2007

(65) Prior Publication Data

US 2009/0294216 A1 Dec. 3, 2009

(51) Int. Cl.
*F16C 33/66* (2006.01)
(52) U.S. Cl. ........................................ 384/475
(58) Field of Classification Search .................. 384/462, 384/473–475, 499, 502, 506
See application file for complete search history.

(56) References Cited

U.S. PATENT DOCUMENTS

| 3,195,965 | A | * | 7/1965 | Van Dorn ...................... 384/475 |
| 4,322,117 | A | | 3/1982 | Briggs |
| 4,334,720 | A | | 6/1982 | Signer |
| 4,342,489 | A | | 8/1982 | Lenz et al. |
| 4,453,784 | A | | 6/1984 | Kildea et al. |
| 4,463,994 | A | * | 8/1984 | Eliason et al. ................ 384/506 |
| 4,468,066 | A | | 8/1984 | Alcorta et al. |
| 5,106,209 | A | | 4/1992 | Atkinson et al. |
| 5,183,342 | A | * | 2/1993 | Daiber et al. ................ 384/475 |
| 5,489,190 | A | | 2/1996 | Sullivan |
| 5,687,826 | A | | 11/1997 | Kinoshita et al. |
| 5,904,427 | A | | 5/1999 | Braun et al. |
| 6,102,580 | A | | 8/2000 | Alling et al. |
| 6,328,478 | B1 | | 12/2001 | Fukuda et al. |
| 6,409,464 | B1 | | 6/2002 | Fisher et al. |
| 6,511,228 | B2 | | 1/2003 | Dusza |
| 6,682,222 | B2 | | 1/2004 | Fisher |
| 7,036,989 | B2 | | 5/2006 | Taki et al. |
| 7,070,333 | B2 | | 7/2006 | Ito et al. |
| 7,124,857 | B2 | | 10/2006 | Gekht et al. |
| 2006/0263202 | A1 | | 11/2006 | Dins et al. |

FOREIGN PATENT DOCUMENTS

EP 1640627 A1 3/2006

OTHER PUBLICATIONS

EP Search Report, 08157122.6-2424/2031261 dated Aug. 25, 2009.

* cited by examiner

*Primary Examiner* — Thomas R Hannon
(74) *Attorney, Agent, or Firm* — Ingrassia Fisher & Lorenz, PC (57) ABSTRACT

Systems are provided for supplying oil from an oil source to a bearing assembly, the bearing assembly including a cage having a forward rail and an aft rail, and at least one bearing disposed therebetween.

20 Claims, 5 Drawing Sheets

SYSTEMS FOR SUPPLYING OIL FROM AN OIL SOURCE TO A BEARING ASSEMBLY

STATEMENT REGARDING FEDERALLY SPONSORED RESEARCH OR DEVELOPMENT

This invention was made with Government support under Agreement No. F33615-03-D-2355-0006 awarded by the US Air Force. The Government may have certain rights in this invention.

TECHNICAL FIELD

The inventive subject matter generally relates to oil distribution, and more particularly relates to systems and methods for supplying oil from an oil source to a bearing assembly.

BACKGROUND

A gas turbine engine may be used to power various types of vehicles and systems. A particular type of gas turbine engine that may be used to power aircraft is a turbofan gas turbine engine. A turbofan gas turbine engine may include, for example, a fan section, a compressor section, a combustor section, a turbine section, and an exhaust section. The fan section induces air from the surrounding environment into the engine and accelerates a fraction of the air toward the compressor section. The remaining fraction of air is accelerated into and through a bypass plenum, and out the exhaust section. The compressor section, which may include a high pressure compressor and a low pressure compressor, raises the pressure of the air it receives from the fan section to a relatively high level. The compressed air then enters the combustor section, where a ring of fuel nozzles injects a steady stream of fuel into a plenum. The injected fuel is ignited to produce high-energy compressed air. The air then flows into and through the turbine section causing turbine blades therein to rotate and generate energy. The air exiting the turbine section is exhausted from the engine via the exhaust section, and the energy remaining in the exhaust air aids the thrust generated by the air flowing through the bypass plenum.

To increase operational efficiency, one or more bearing assemblies may be included in various sections of the engine. In one example, a bearing assembly is implemented in the high pressure compressor. In such case, the bearing assembly may be mounted through a bore to a high speed rotor and may include a split face inner race, an outer race, and a ball element supported therebetween. The split face inner race includes a forward ring and an aft ring. A cage may be included between the split face inner race and the outer race to maintain circumferential positioning of the bearing balls. In this regard, the cage may have a forward rail and an aft rail between which the bearing balls may be disposed.

Because the rotor, and hence, portions of the bearing assembly, may rotate at high speeds (e.g., greater than $2 \times 10^6$ dN, where d is the bearing bore diameter in millimeters and the N is the speed of the rotor in revolutions per minute), lubricant may be used to reduce friction and to provide cooling to the bearing assembly. The lubricant may be delivered to the bearing assembly via a plurality of axial and radial grooves that make up a lubrication system. Conventionally, a first section of the axial grooves are formed on an inner surface of the forward ring, and a second section of the axial grooves may be formed on an inner surface of the aft ring. The forward and aft rings are held together by a pin to maintain the first and second section of the axial grooves in alignment with each other. The radial grooves communicate with the axial grooves to feed lubricant to the cage rails and the bearings.

Although the aforementioned lubrication system has been adequate for lubricating the high pressure compressor bearing assembly, it may be improved. In particular, use of a pin to maintain the necessary alignment between the forward and aft rings may cause unwanted stress concentration in certain areas of the bearing assembly during high speed applications. Additionally, in high speed applications, the split face inner race may experience a waviness condition, which may not allow substantially even circumferential distribution of the lubricant to the cage rails and bearings. Consequently, premature bearing wear may occur.

Accordingly, it is desirable to have a system that provides substantially even circumferential distribution of lubricant around the split face inner ring during operation. Additionally, it is desirable for the system to be capable of distributing the lubricant to the forward and aft rails of a cage and to the bearings at a desired ratio. Moreover, it is desirable to for the system to be capable of providing lubrication, regardless of how the forward and aft rings are oriented relative to each other. Furthermore, other desirable features and characteristics of the inventive subject matter will become apparent from the subsequent detailed description of the inventive subject matter and the appended claims, taken in conjunction with the accompanying drawings and this background of the inventive subject matter.

BRIEF SUMMARY

Systems are provided for supplying oil from an oil source to a bearing assembly, the bearing assembly including a cage having a forward rail and an aft rail, and at least one bearing disposed therebetween.

In an embodiment, by way of example only, a system for supplying oil from an oil source to a bearing assembly that includes a cage having a forward rail and an aft rail and at least one bearing disposed therebetween is provided. The system includes a forward ring and an aft ring. The forward ring has an inner surface, an outer surface, a distribution annulus, a first plurality of axial channels, a first plurality of radial holes, an annular well, and a first annular dam. The distribution annulus, the first plurality of axial channels, the annular well, and the first annular dam are formed on the forward ring inner surface. The first annular dam is formed adjacent the annular well. The first plurality of axial channels extend axially between the distribution annulus and the annular well, and each radial hole of the first plurality of radial holes extends between a corresponding axial channel and the forward ring outer surface and is configured to provide a portion of the oil to the forward rail. The aft ring has a forward face disposed adjacent the forward ring and has an inner surface, an outer surface, a second plurality of axial channels, a plurality of radial face slots, and a second plurality of radial holes. The second plurality of axial channels extend along a length of the aft ring inner surface and are configured to receive oil from the first annular dam. The plurality of radial face slots are formed in the forward face and are configured to supply a portion of the oil from a first portion of the second plurality of axial channels to the bearing. Each radial hole of the second plurality of radial holes extends from a corresponding axial channel to the aft ring inner surface to the outer surface and is configured to provide a portion of the oil from a second portion of the second plurality of axial channels to the aft rail.

In another embodiment, by way of example only, the system includes an annular oil delivery device, a forward ring, an aft ring, and a barrier. The annular oil delivery device is disposed adjacent the forward ring. The forward ring is disposed adjacent the annular oil delivery device and has an inner surface, an outer surface, a distribution annulus, a first plurality of axial channels, a first plurality of radial holes, an annular well, and a first annular dam. The distribution annulus, the first plurality of axial channels, the annular well, and the first annular dam are formed on the forward ring inner surface. The distribution annulus is configured to receive oil from the oil delivery device. The first annular dam is formed adjacent the annular well. The first plurality of axial channels extend axially between the distribution annulus and the annular well, and each radial hole of the plurality of radial holes extends between a corresponding axial channel and the forward ring outer surface and is configured to provide a portion of the oil to the forward rail. The aft ring has a forward face disposed adjacent the forward ring and an aft face. The aft ring has an inner surface, an outer surface, a second plurality of axial channels, a plurality of radial face slots, and a second plurality of radial holes. The second plurality of axial channels extend along a length of the aft ring inner surface and are configured to receive oil from the first annular dam. The plurality of radial face slots are formed in the forward face and are configured to supply a portion of the oil from a first portion of the second plurality of axial channels to the bearing. Each radial hole of the second plurality of radial holes extends from a corresponding axial channel to the aft ring inner surface to the outer surface and is configured to provide a portion of the oil from a second portion of the second plurality of axial channels to the aft rail. The barrier is disposed adjacent the aft face of the aft ring.

BRIEF DESCRIPTION OF THE DRAWINGS

The inventive subject matter will hereinafter be described in conjunction with the following drawing figures, wherein like numerals denote like elements.

DETAILED DESCRIPTION

The following detailed description is merely exemplary in nature and is not intended to limit the inventive subject matter or the application and uses of the inventive subject matter. Furthermore, there is no intention to be bound by any theory presented in the preceding background or the following detailed description.

Figure 1:
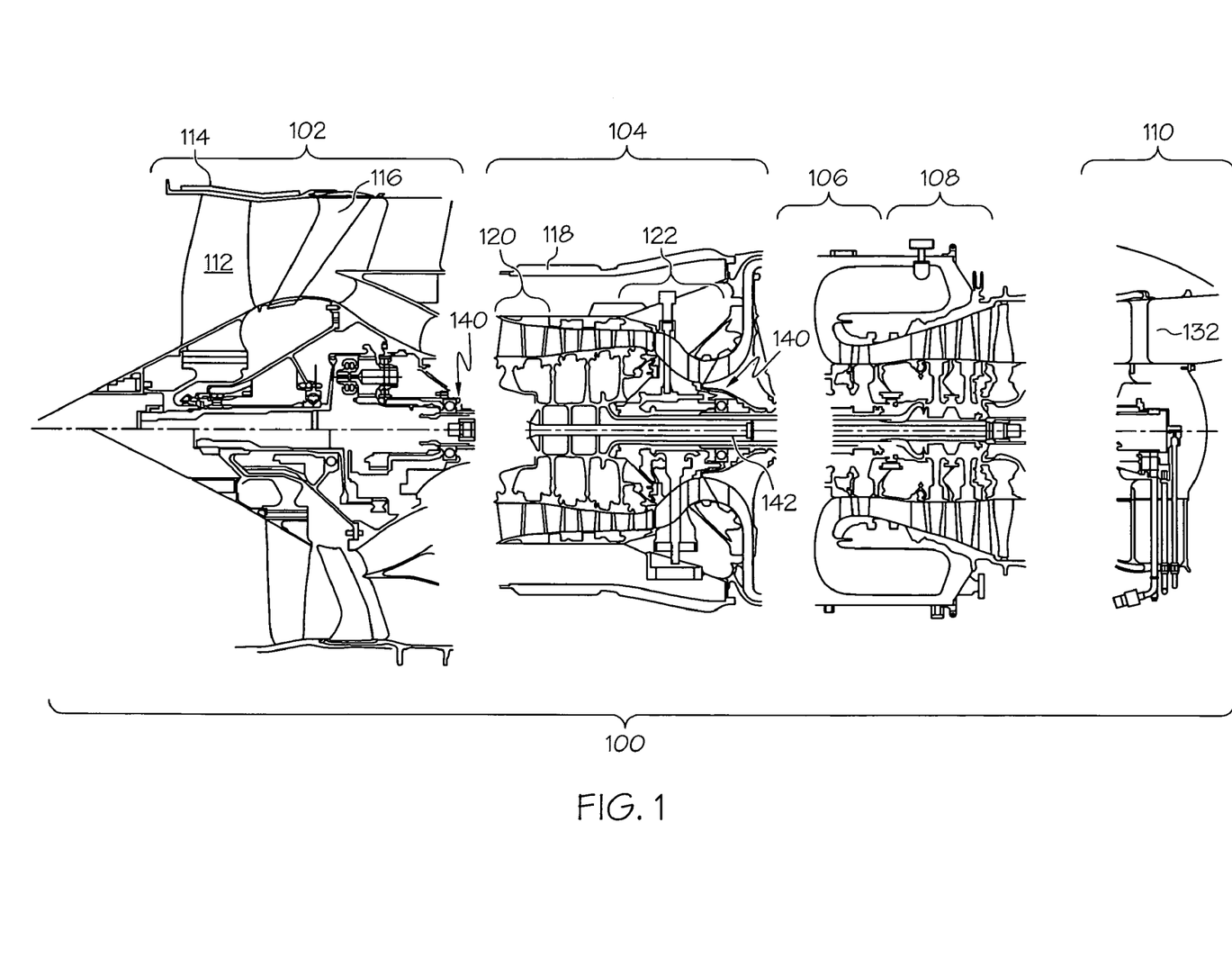
FIG. 1 is a simplified cross-sectional side view of an exemplary multi-spool turbofan gas turbine jet engine, according to an embodiment.

FIG. 1 is simplified cross-sectional side view of a multi-spool turbofan gas turbine engine 100, according to an embodiment. The engine 100 may include a fan section 102, a compressor section 104, a combustion section 106, a turbine section 108, and an exhaust section 110. The fan section 102 includes a fan 112, which is mounted in a fan case 114. The fan 112 draws air into the fan section 102 and accelerates it. A fraction of the accelerated air is directed through a bypass section 116 disposed between the fan case 114 and an engine cowl 118, and provides a forward thrust. The remaining fraction of air is directed into the compressor section 104.

The compressor section 104 may include an intermediate pressure compressor 120 and a high pressure compressor 122. The intermediate pressure compressor 120 raises the pressure of the air, and directs the compressed air into the high pressure compressor 122. The high pressure compressor 122 compresses the air still further, and directs the high pressure air into the combustion section 106. The high pressure air is mixed with fuel and combusted in the combustion section 106 and then directed into the turbine section 108.

The combusted air expands through three turbines of the turbine section 108, which are disposed in axial flow series, causing the turbines to rotate. The air is then exhausted through a propulsion nozzle 132 disposed in the exhaust section 110, providing additional forward thrust. As the turbines rotate, each drives equipment in the engine 100 via concentrically disposed rotors or spools.

To support axial and radial loads that may be exerted on the rotor by engine components mounted thereon, a plurality of bearing assemblies 140 may be mounted to various sections of the engine 100. In an example, a bearing assembly 140 may be disposed in the high pressure compressor 122, as shown in a cross-sectional view in FIG. 2. The bearing assembly 140 is mounted to a high speed rotor 142 and includes a split face inner race 148, an outer race 150, and a plurality of bearing balls 152 (only one of which is shown). The split face inner race 148 includes a forward ring 154 and an aft ring 156 that are adjacent to each other. The plurality of bearing balls 152 are maintained axially in position by the forward and aft rings 154, 156. A cage 162 is maintained axially in position by the plurality of bearing balls 152 between a forward cage rail 158 and an aft cage rail 160. The cage 162 is also maintained radially by an outer surface 176 of the forward ring 154 and an outer surface 198 of the aft ring 156 with a pilot clearance 164 at an inner surface 178 of the cage 162.

Figure 2:
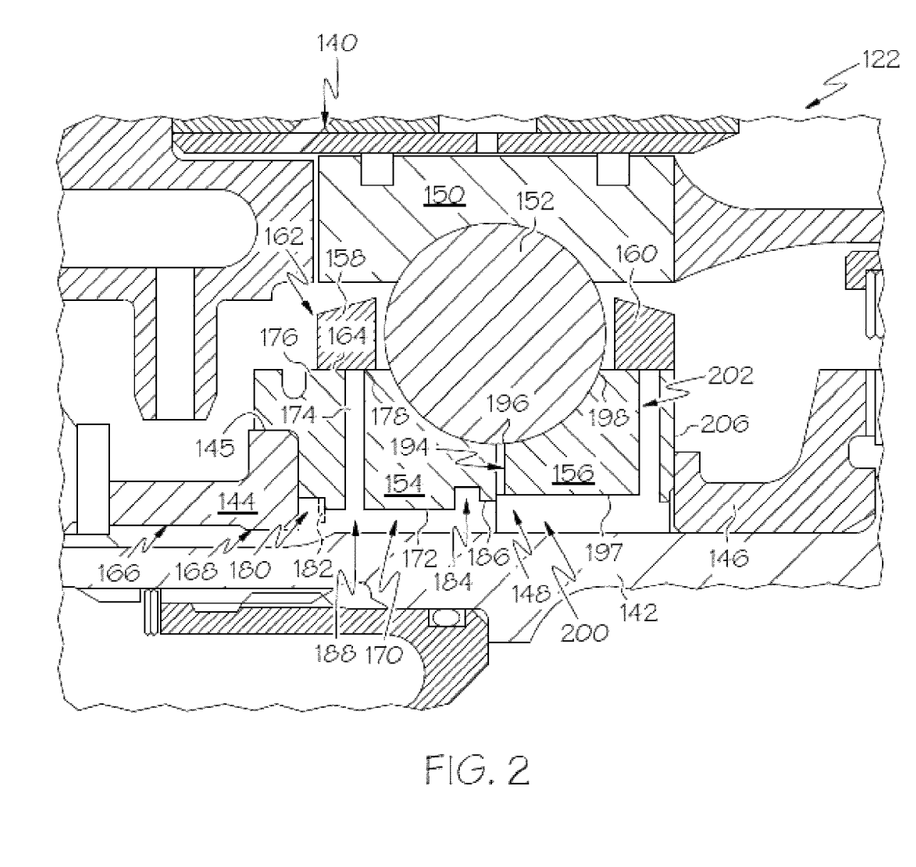
FIG. 2 is a cross section view of a portion of a compressor section that may be used in the engine of FIG. 1, according to an embodiment.

Because the high speed rotor 142 rotates at speeds of $2 \times 10^6$ dN or greater, where d is an inner diameter of the split face inner race 148 in millimeters and N is a speed in revolutions per minute at which the split face inner race 148 rotates relative to the outer race 150, the bearing assembly 140 and the cage 162 are lubricated during engine operation. Accordingly, a system for supplying oil is employed. The system is made up of an oil delivery device 144, a series of slots, channels, and passages that are formed in the split face inner race 148 of the bearing assembly 140, and a barrier 146. In an embodiment, the system may be configured such that the plurality of bearing balls 152 receives more lubrication than the forward and aft cage rails 158, 160. For example, the system may be configured such that oil flowing is distributed between the forward rail 158, the bearing balls 152, and the aft rail 160 at about a 25:50:25 ratio.

Figure 3:
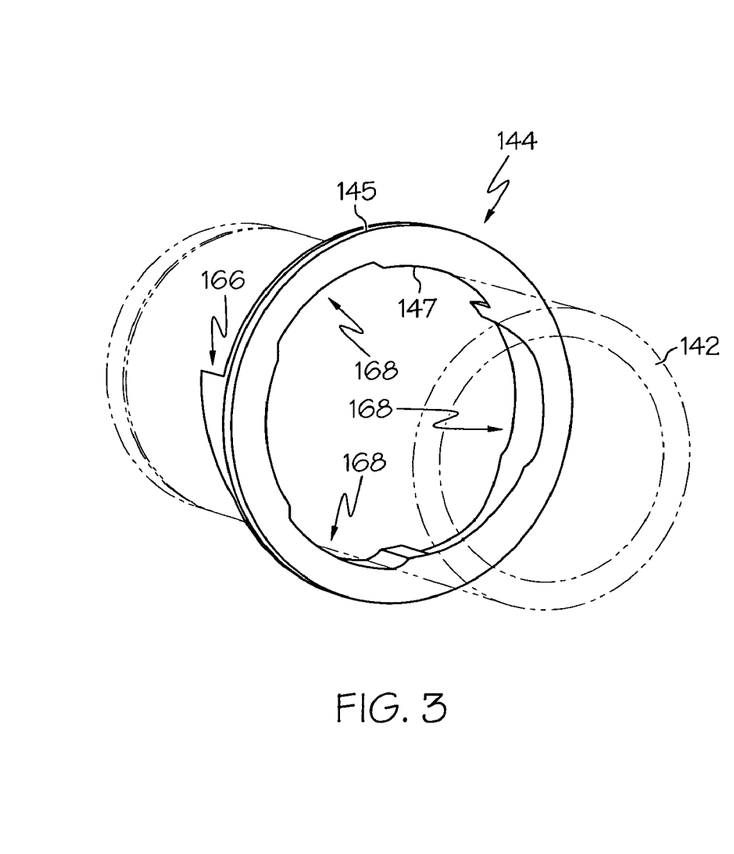
FIG. 3 is an isometric view of an oil delivery device mounted to a shaft, according to an embodiment.

As alluded to above, the oil delivery device 144 is configured to receive oil from the oil source and to distribute the oil to the remainder of the system. With additional reference to FIG. 3, an isometric view of an oil delivery device 144 mounted to the high speed rotor 142 is provided, according to an embodiment. In an embodiment, the oil delivery device 144 may be annular and include at least one opening 166 and at least one chamber 168. The openings 166 extend between an outer surface 145 and an inner surface 147 of the oil delivery device 144. The chambers 168 are formed on the inner surface 147 of the oil delivery device 144, and the openings 166 provide passage to the chambers 168. In an embodiment, three openings 166 and three chambers 168 are included. However, other embodiment may include more or fewer openings or chambers. In any case, the chambers 168 may be substantially evenly spaced circumferentially around the oil delivery device 144 to allow substantially even distribution of the oil therearound. Although the oil delivery device 144 is depicted in this embodiment as being an annular scoop, it may be any other device capable of oil delivery in other embodiments.

Figure 4:
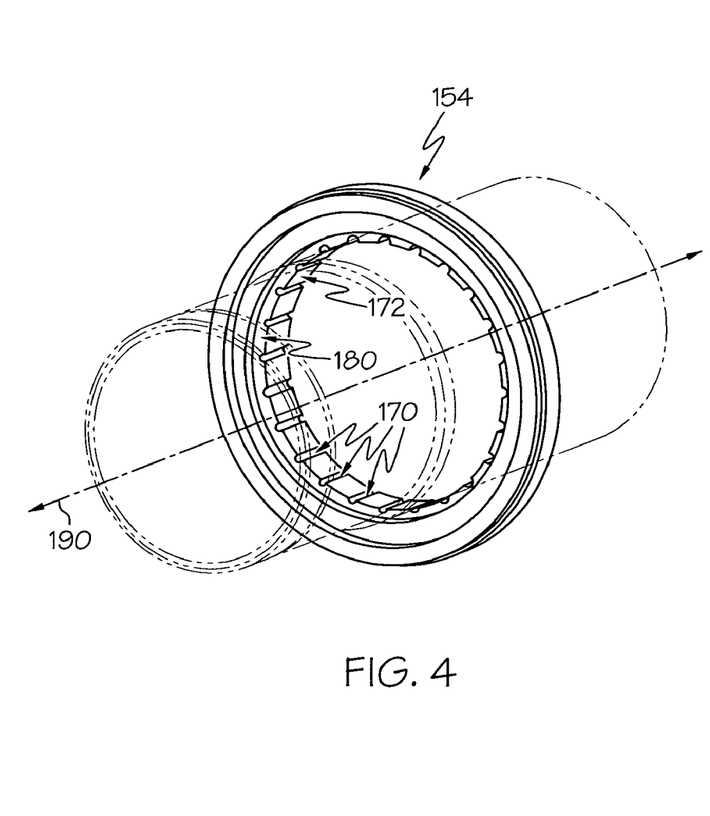
FIG. 4 is an isometric view of a forward ring mounted to a shaft from a first end, according to an embodiment.
Figure 5:
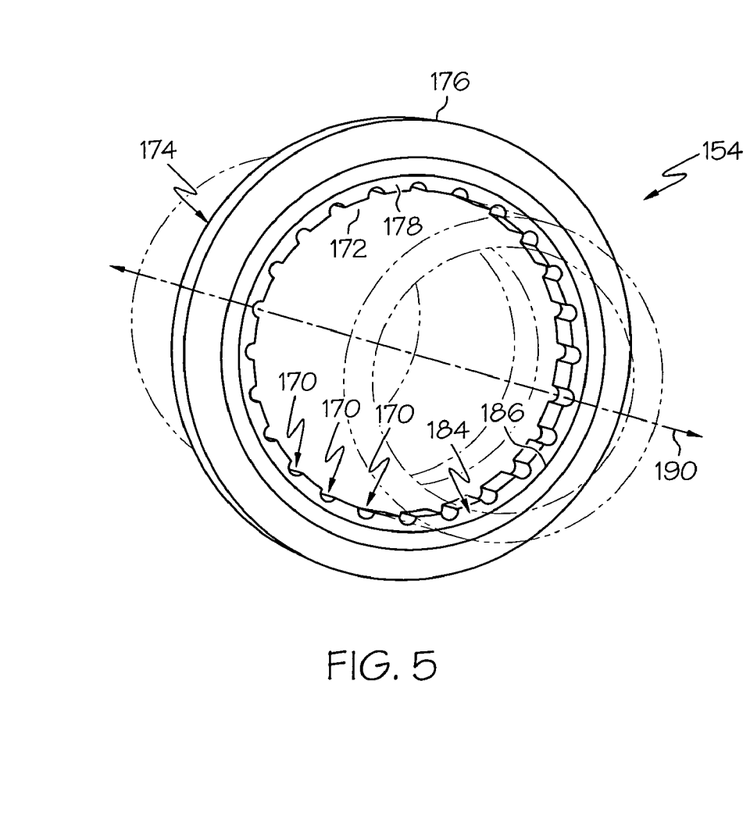
FIG. 5 is an isometric view of a forward ring mounted to a shaft from a second end, according to an embodiment.

The oil from the three chambers 168 in the embodiment is directed toward the forward ring 154 of the split face inner race 148. The forward ring 154 is shown in forward and aft isometric view in FIGS. 4 and 5, respectively. With reference to FIGS. 2, 4, and 5, in an embodiment, the chambers 168 feed the oil to a distribution annulus 180 that is formed in an inner surface 172 of the forward ring 154. The distribution annulus 180 is configured to distribute the oil circumferentially around the forward ring 154 before it flows downstream. To ensure that the oil is substantially evenly distributed circumferentially, the distribution annulus 180 may have a substantially constant radial depth around the circumference of the forward ring 154. In another embodiment, the distribution annulus 180 may have a substantially constant radial distance from a centerline 190 of the forward ring 154.

Adjacent to the distribution annulus 180 is a first plurality of axial channels 170 that extends axially along a portion of the inner surface 172 of the forward ring 154. In an embodiment, each axial channel 170 has a predetermined radial depth that is less than the radial depth of the distribution annulus 180. Additionally, the depths of the axial channels 170 may be substantially equal to each other. As a result, the oil may be evenly distributed to each of the axial channels 170, during operation. In another embodiment, an annular dam 182 is included between the distribution annulus 180 and the first plurality of axial channels 170. In this regard, the annular dam 182 may be configured to prevent the oil from flowing downstream until the distribution annulus 180 is filled to a particular volume. The annular dam 182 may have a substantially constant radial distance from the centerline 190 so that the oil may spill uniformly circumferentially over the dam 182. Thus, the axial channels 170 in this embodiment may or may not have a radial depth that is less than that of the distribution annulus 180, but would have a radial depth that is greater than the dam 182. In any case, in an embodiment, twenty-four axial channels 170 are included and are substantially evenly spaced circumferentially around the forward ring 154. However, in other embodiments, more or fewer axial channels distributed around the forward ring 154 may alternatively be employed, depending on a desired manner in which the oil is to be distributed around the forward ring 154. In an embodiment, each axial channel 170 has a substantially constant radial depth along its axial length.

As shown in FIGS. 2, 4, and 5, some of the axial channels 170 feed a first plurality of radial holes 174. The radial holes 174 extend radially outwardly from corresponding axial channels 170 to an outer surface 176 of the forward ring 154 to allow oil to flow to an inner surface 178 of the cage forward rail 158. Although six radial holes 174 are shown, fewer or more may alternatively be employed. In an embodiment, the radial holes 174 are spaced substantially evenly around the circumference of the forward ring 154.

To substantially evenly distribute the oil after a portion thereof is distributed to the six radial holes 174, an annular well 184 and an annular dam 186 are included on the inner surface 172 of the forward ring 154. The annular well 184 is configured to receive and collect oil from the first plurality of axial channels 170 and to contain the oil circumferentially around the forward ring 154 before it flows downstream. The annular dam 186 prevents the oil from flowing to the aft ring 156 until the annular well 184 is filled. To ensure that the oil is substantially evenly distributed circumferentially, the annular dam 186 may have a substantially constant radial depth around the circumference of the forward ring 154. In another embodiment, the annular dam 186 may have a substantially constant radial distance from a centerline 190 of the forward ring 154.

Figure 6:
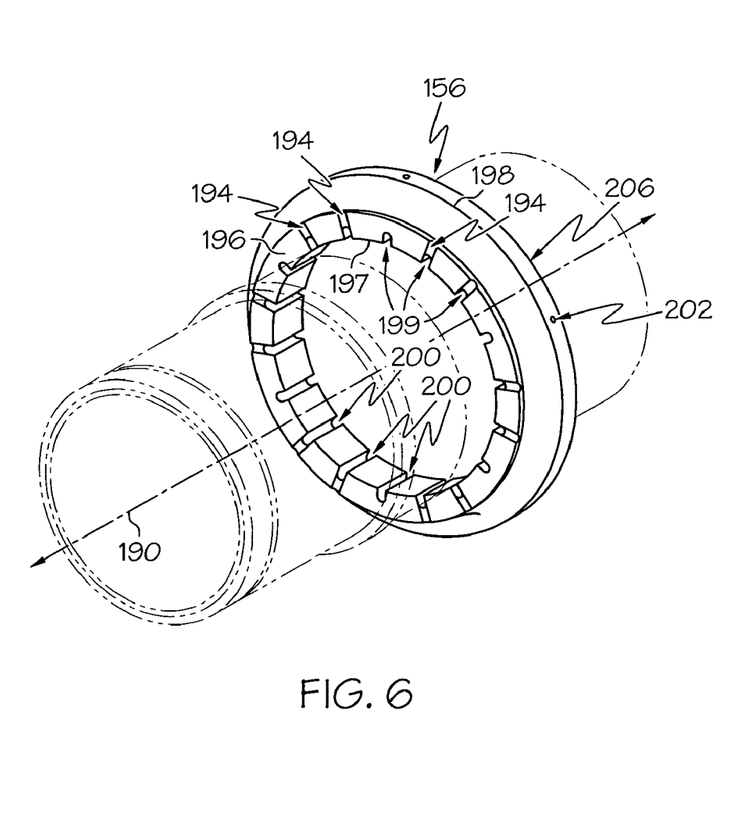
FIG. 6 is an isometric view of an inner ring mounted to a shaft from a first end, according to an embodiment.

As briefly mentioned above, the oil then flows toward the aft ring 156. FIG. 6 is an isometric view of the aft ring 156, according to an embodiment. The aft ring 156 includes a forward face 196 having openings 199 and a plurality of radial face slots 194. The openings 199 lead to a second plurality of axial channels 200 formed in the inner surface 197 of the aft ring 156. In an embodiment, the openings 199 are configured to provide substantially even distribution of the oil to the second plurality of axial channels 200 and thus, may have a substantially similar geometry and may be substantially evenly distributed circumferentially around the forward face 196. In an embodiment, each axial channel 200 may form a corresponding opening 199.

A first portion of the second plurality of axial channels 200 are configured to provide passage to the plurality of radial face slots 194, thus one radial face slot 194 may substantially align with a corresponding axial channel 200. The plurality of radial face slots 194 are configured to provide flow paths to the plurality of bearing balls 152 (FIG. 2) and, in this regard, extend radially outwardly from an inner surface 197 of the aft ring 156 to an outer surface 198 thereof. In an embodiment, twelve radial face slots 194 are included; however, it will be appreciated that fewer or more may alternatively be employed. In an embodiment, the first portion of the second plurality of axial channels 200 may extend downstream from the plurality of radial face slots 194 as well.

A second portion of the axial channels 200 are configured to provide passage to a second plurality of radial holes 202 that extend from the inner surface 197 thereof to the outer surface 198. The second plurality of radial holes 202 provides flow paths to the aft rail 160 of the cage 162. In an embodiment, six radial holes 202 are included. However, in other embodiment, more or fewer radial holes 202 may alternatively be employed. In any case, the radial holes 202 are spaced substantially evenly around a circumference of the aft ring 156 to substantially evenly distribute oil circumferentially to the cage aft rail 160.

To prevent oil from leaking into other sections of the engine 100, the barrier 146 is mounted to the high speed rotor 142 adjacent an aft face 206 of the aft ring 156. In an embodiment, the axial channels 200 may extend to the barrier 146. The barrier 146 may be a rotor face seal, a sealing plate, a nut, or any other component capable of preventing the oil from leaking out of the axial channels 200. In another embodiment, the axial channels 200 may not extend to aft face 206 of the aft ring thereby not requiring a barrier 146 to prevent the oil from escaping the axial channels 200. In any case, although eighteen total axial channels 200 are included in this embodiment, where six lead to the radial holes 202 and twelve lead to the face slots 194, it will be appreciated that fewer or more may alternatively be employed.

Figure 7:
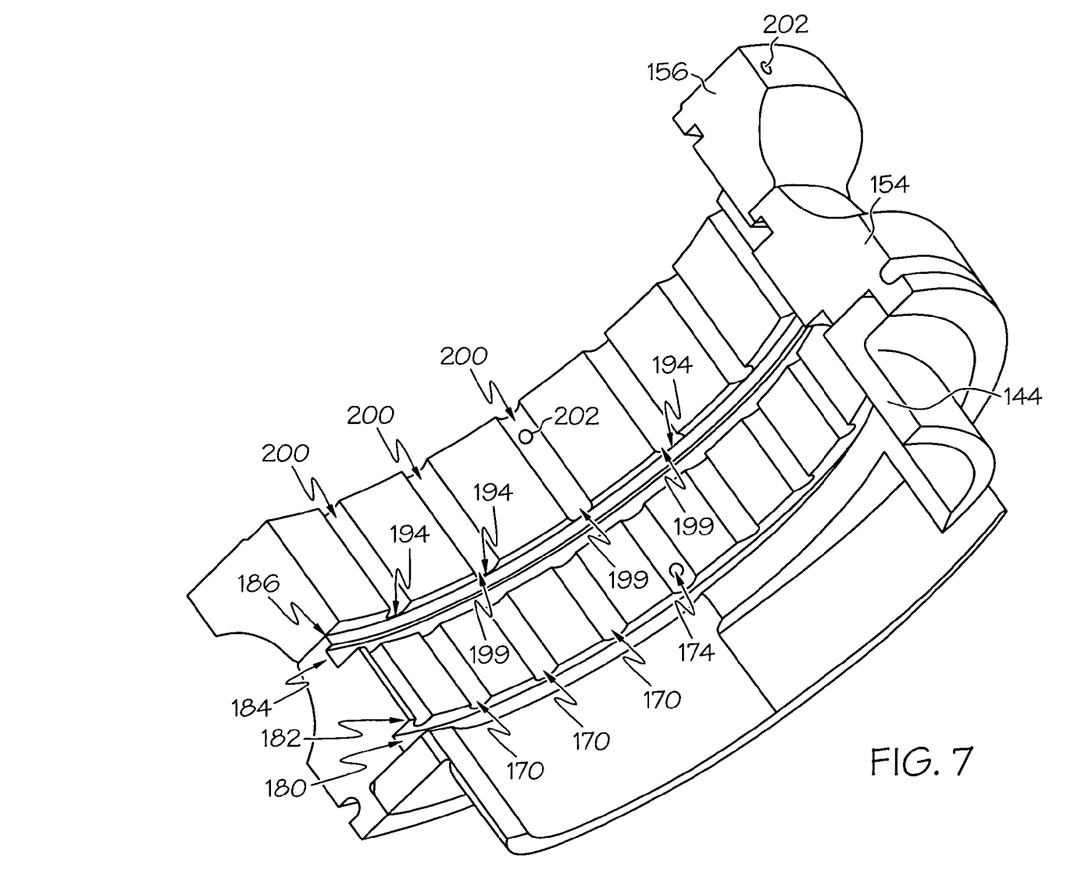
FIG. 7 is an isometric view of a portion of an inner surface of the oil delivery device, forward ring, and aft ring, according to an embodiment.

Configuring the channels and holes as described above allows the oil to be distributed through the system in a controlled manner. With reference to FIGS. 2 and 7, which depict an isometric view of a portion of an inner surface of the oil delivery device 144, forward ring 154 and aft ring 156, according to an embodiment, during operation, the oil migrates axially to first collect in the distribution annulus 180. Centrifugal forces from the rotation of the high speed rotor 142 cause the oil to collect in the distribution annulus 180. Because the distribution annulus 180 may have a substantially constant radial depth and radial distance from the forward ring centerline 190 (FIGS. 4 and 5), the distribution annulus 180 may have a substantially constant volume around its circumference which allows the oil therein to collect substantially evenly therearound. However, even distribution to the first plurality of axial channels 170 may still be achieved without the aforementioned feature. In an embodiment, once the distribution annulus 180 is filled with oil, the oil spills into the first plurality of axial channels 170. The oil spills substantially evenly circumferentially around the forward ring 154 because the axial channels 170 have radial depths that are substantially equal to each other and substantially equal radial distance from the forward ring centerline 190. In another embodiment, the oil may spill over the annular dam 182, which also allows the oil to spill substantially evenly circumferentially around the forward ring 154 due to a substantially constant radial distance of the annular dam 182 from the forward ring centerline 190.

As mentioned above, the oil flows to the first plurality of axial channels 170. In this embodiment, six of the twenty-four axial channels 170 divert a portion of an initial oil flow to six corresponding radial holes of a first plurality of radial holes 174, while the remaining eighteen axial channels 170 feed the oil downstream. In this way, 25% of the initial oil flow is distributed to the six radial holes 174, while the remaining 75% is distributed to the remainder of the system.

To distribute the remaining oil to downstream portions of the system in a controlled manner, the oil is flowed to the annular well 184, which collects oil from the eighteen axial channels 170. The annular well 184 may have a substantially constant radial depth and radial distance from the forward ring centerline 190, which may provide a substantially constant volume around the circumference of the forward ring 154 to thereby allow the oil to collect therein. Because the annular dam 186 has a substantially constant radial distance from the forward ring centerline 190, oil in excess of the volume of the annular well can be substantially evenly distributed into the plurality of openings 199 and the second plurality of axial channels 200 of the aft ring 156. Additionally, because the oil collects substantially evenly around the circumference of the annular dam 186 before it enters the openings 199, the aft ring 156 may be rotationally positioned in any manner relative to the forward ring 154. Such feature eliminates conventionally included anti-rotation pins, as substantially even distribution of the oil from the forward ring 154 to the aft ring 156 occurs regardless of how the two are oriented relative to each other.

As mentioned above, after the oil spills over annular dam 186, the oil spills into openings 199. Because the oil spills substantially evenly over the annular dam 186 and the openings 199 provide inlets to the second plurality of axial channels 200 and the openings 199 are substantially equivalent in geometry and substantially equally spaced about the face 196, the oil may be substantially uniformly distributed circumferentially around the aft ring 156. In this way, a controlled amount of oil is directed into the twelve radial face slots 194 and a controlled amount of oil is directed into the second plurality of radial holes 202. Because the aft ring 156 is disposed adjacent the barrier 146, oil flowing through the axial channels 200 is forced to flow back into the radial face slots 194 or the second plurality of radial holes 202 to thereby ensure flow thereto respectively. As a result, the axial channels 200, which provide a flowpath to the twelve face slots 194 for lubrication to the plurality of bearing balls 152 and six radial holes 202 for lubrication to the aft cage rail 160, allow about 50% of the initial oil flow to be distributed to the radial face slots 194 (i.e., to the plurality of bearing balls 152) and about 25% of the initial oil flow to be distributed to the radial holes 202 (i.e., to the aft rail 160 of the cage 162). Moreover, providing additional axial channels 200 for the oil to flow not only to the twelve radial face slots 194 or to the six radial holes 202 but also as "blind channels" to the barrier 146 may substantially reduce raceway waviness that may be experienced by the aft ring 156 during operation.

A system has now been provided that distributes lubricant to the forward and aft rails of a cage and to the bearing in a desired manner, during engine operation. In addition, the system may substantially evenly distribute the lubricant circumferentially during operating, regardless of how the bearing is orientated with the oil delivery device or how the forward and aft rings are oriented relative to each other. In particular, because of the circumferential distribution functionality of the annulus 180, circumferential clocking requirement may not be included in configurations having an annular scoop or other oil delivery system. The above-described system, which in contrast to conventional systems, may not include anti-rotation pins, still allows circumferential distribution of the oil managed by the distribution annulus 180 regardless of how the oil delivery device 144 and the forward ring 154 are oriented relative to each other.

While at least one exemplary embodiment has been presented in the foregoing detailed description of the inventive subject matter, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the inventive subject matter. It being understood that various changes may be made in the function and arrangement of elements described in an exemplary embodiment without departing from the scope of the inventive subject matter as set forth in the appended claims.

What is claimed is:

1. A system for supplying oil from an oil source to a bearing assembly, the bearing assembly including a cage having a forward rail and an aft rail, and at least one bearing disposed therebetween, the system comprising:

a forward ring having an inner surface, an outer surface, a distribution annulus, a first plurality of axial channels, a first plurality of radial holes, an annular well, and a first annular dam, the distribution annulus, the first plurality of axial channels, the annular well, and the first annular dam formed on the forward ring inner surface, the first annular dam formed adjacent the annular well, the first plurality of axial channels extending axially between the distribution annulus and the annular well, and each radial hole of the first plurality of radial holes extending between a corresponding axial channel and the forward ring outer surface and configured to provide a portion of the oil to the forward rail; and an aft ring having a forward face disposed adjacent the forward ring, the aft ring having an inner surface, an outer surface, a second plurality of axial channels, a plurality of radial face slots, and a second plurality of radial holes, the second plurality of axial channels extending along a length of the aft ring inner surface and configured to receive oil from the first annular dam, the plurality of radial face slots formed in the forward face and configured to supply a portion of the oil from a first portion of the second plurality of axial channels to the bearing, and each radial hole of the second plurality of radial holes extending from a corresponding axial channel to the aft ring inner surface to the outer surface and configured to provide a portion of the oil from a second portion of the second plurality of axial channels to the aft rail.

2. The system of claim 1, wherein the first plurality of radial holes, the plurality of radial face slots, and the second plurality of radial holes are configured to such that the oil is distributed to each at a ratio of 25:50:25.

3. The system of claim 2, wherein the system includes twenty-four axial channels comprising the first plurality of axial channels, six radial holes comprising the first plurality of radial holes, twelve radial face slots, and six radial holes comprising the second plurality of radial holes.

4. The system of claim 1, wherein each of the first plurality of axial channels and the first plurality of radial holes are substantially evenly spaced circumferentially around the forward ring.

5. The system of claim 4, wherein the each of the plurality of radial face slots, the second plurality of axial channels, and the second plurality of radial holes are substantially evenly spaced circumferentially around the aft ring.

6. The system of claim 1, wherein the first plurality of axial channels and the first annular dam each have a substantially constant radial depth circumferentially around the forward ring.

7. The system of claim 1, wherein the first plurality of axial channels and the first annular dam each have a substantially constant radial distance from a centerline of the forward ring.

8. The system of claim 1, wherein:
the forward face of the aft ring includes a plurality of openings, each opening corresponding with an axial channel of the second plurality of axial channels, wherein the plurality of openings are configured to provide substantially even distribution of the oil to the plurality of radial face slots and to the second plurality of radial holes.

9. The system of claim 8, wherein:
each axial channel of the second plurality of axial channels forms a corresponding opening of the plurality of openings.

10. The system of claim 1, wherein the first plurality of axial channels has a radial depth and the first annular dam has a radial depth that is less than the radial depth of the first plurality of axial channels.

11. The system of claim 1, wherein the forward ring further comprises a second annular dam disposed between the distribution annulus and the first plurality of axial channels.

12. The system of claim 11, wherein the second annular dam has a substantially constant radial distance from a centerline of the forward ring.

13. A system for supplying oil from an oil source to a bearing assembly, the bearing assembly including a cage having a forward rail and an aft rail, and at least one bearing disposed therebetween, the system comprising:
an annular oil delivery device;
a forward ring disposed adjacent the annular oil delivery device and having an inner surface, an outer surface, a distribution annulus, a first plurality of axial channels, a first plurality of radial holes, an annular well, and a first annular dam, the distribution annulus, the first plurality of axial channels, the annular well, and the first annular dam formed on the forward ring inner surface, the distribution annulus configured to receive oil from the oil delivery device, the first annular dam formed adjacent the annular well, the first plurality of axial channels extending axially between the distribution annulus and the annular well, and each radial hole of the plurality of radial holes extending between a corresponding axial channel and the forward ring outer surface and configured to provide a portion of the oil to the forward rail;
an aft ring having a forward face disposed adjacent the forward ring and an aft face, the aft ring having an inner surface, an outer surface, a second plurality of axial channels, a plurality of radial face slots, and a second plurality of radial holes, the second plurality of axial channels extending along a length of the aft ring inner surface and configured to receive oil from the first annular dam, the plurality of radial face slots formed in the forward face and configured to supply a portion of the oil from a first portion of the second plurality of axial channels to the bearing, and each radial hole of the second plurality of radial holes extending from a corresponding axial channel to the aft ring inner surface to the outer surface and configured to provide a portion of the oil from a second portion of the second plurality of axial channels to the aft rail; and
a barrier disposed adjacent the aft face of the aft ring.

14. The system of claim 13, comprising a barrier disposed adjacent the aft ring and the second plurality of axial channels extend to the barrier.

15. The system of claim 13, wherein the first plurality of radial holes, the plurality of radial face slots, and the second plurality of radial holes are configured to such that the oil is distributed to each at a ratio of 25:50:25.

16. The system of claim 13, wherein each of the first plurality of axial channels and the first plurality of radial holes are substantially evenly spaced circumferentially around the forward ring.

17. The system of claim 16, wherein the each of the plurality of radial face slots, the second plurality of axial channels, and the second plurality of radial holes are substantially evenly spaced circumferentially around the aft ring.

18. The system of claim 13, wherein the first plurality of axial channels and the first annular dam each have a substantially constant radial distance from a centerline of the forward ring.

19. The system of claim 13, wherein the first plurality of axial channels has a radial depth and the first annular dam has a radial depth that is less than the radial depth of the distribution annulus.

20. The system of claim 13, wherein the forward ring further comprises a second annular dam disposed between the distribution annulus and the first plurality of axial channels and the second annular dam has a substantially constant radial distance from a centerline of the forward ring.

* * * * *